United States Patent [19]

Wilkinson

[11] 4,345,261
[45] Aug. 17, 1982

[54] DIELECTRIC RECORDING MEDIUM
[75] Inventor: Richard L. Wilkinson, Torrance, Calif.
[73] Assignee: Discovision Associates, Costa Mesa, Calif.
[21] Appl. No.: 13,706
[22] Filed: Feb. 21, 1979
[51] Int. Cl.$^3$ ................. H04N 5/76; G01D 15/34
[52] U.S. Cl. ................. 346/76 L; 346/135.1; 358/128.5; 369/275; 369/284; 430/945
[58] Field of Search ............... 346/135, 76 L; 358/128.5; 179/100.3 V, 100.1 G; 430/945; 369/284, 275

[56] References Cited
U.S. PATENT DOCUMENTS

| | | | |
|---|---|---|---|
| 3,665,483 | 5/1972 | Becker | 346/135 X |
| 4,000,492 | 12/1976 | Willens | 346/135 X |
| 4,001,840 | 1/1977 | Becker | 346/76 L |
| 4,023,185 | 5/1977 | Bloom | 346/135 |
| 4,032,691 | 6/1977 | Kido | 346/76 L X |
| 4,069,487 | 1/1978 | Kasai | 346/135 X |
| 4,097,895 | 6/1978 | Spong | 346/135 X |
| 4,101,907 | 7/1978 | Bell | 346/135 |
| 4,188,214 | 2/1980 | Kido | 346/76 L X |
| 4,195,313 | 3/1980 | Bell | 346/135.1 X |
| 4,216,501 | 8/1980 | Bell | 346/135.1 X |
| 4,222,071 | 9/1980 | Bell | 346/76 L X |
| 4,225,873 | 9/1980 | Winslow | 346/76 L |
| 4,233,626 | 11/1980 | Bell | 358/128.5 |
| 4,270,132 | 5/1981 | Bell | 346/135.1 |

OTHER PUBLICATIONS

Broadbent, Kent D., a Review of the MCA Disco-Vision System, Journal of the SMPTE, vol. 83, Jul. 1974, pp. 554-559.
Bell & Spong, Antireflection Structures for Optical Recording, IEEE Journal of Quantum Electronics, vol. QE-14, No. 7, Jul. 1978, pp. 487-495.
Bartolini et al., Optical Disk Systems Emerge, IEEE Spectrum, Aug. 1978, pp. 20-28.

Primary Examiner—Joseph W. Hartary
Attorney, Agent, or Firm—Ronald J. Clark

[57] ABSTRACT

A multi-layer information recording medium for storing large amounts of information in a prescribed pattern of microscopic pits, formed by focusing onto the medium a beam of radiation having a prescribed wavelength and having an intensity modulated by the information to be recorded. The record medium includes a substrate having a light-reflective surface on its upper side, a light-absorptive dielectric layer overlaying the substrate and having a thickness approximately equal to an odd integral multiple of one fourth the wavelength of the beam of radiation in the dielectric material, and a thin metallic layer overlaying the dielectric layer and having a light-reflective surface on its lower side. During recording of the information, a substantial proportion of the intensity-modulated beam of radiation is transmitted through the metallic layer to the dielectric layer where it is confined, due to multiple internal reflections by the light-reflective surfaces of the substrate and the metallic layer, until it is finally absorbed by the dielectric material. This causes an evaporation of the dielectric material whenever the intensity of the beam exceeds a predetermined threshold, such evaporation carrying away the overlaying portions of the metallic layer and creating the prescribed pattern of microscopic information-bearing pits.

29 Claims, 5 Drawing Figures

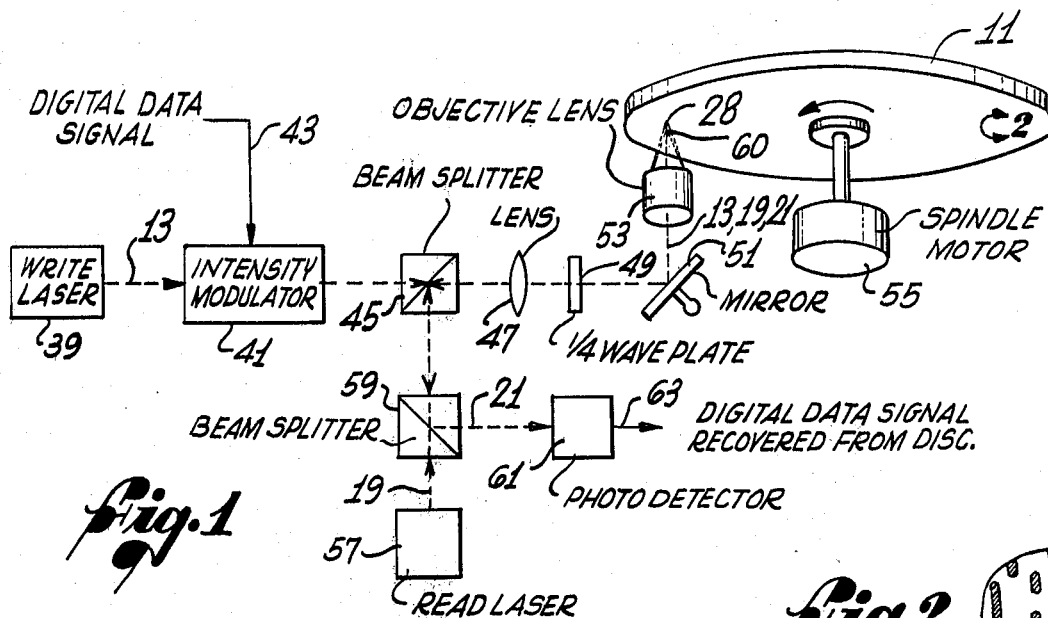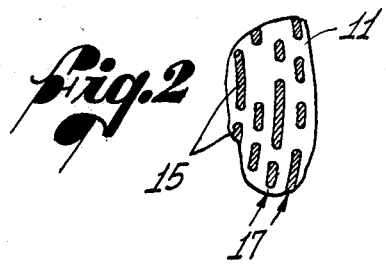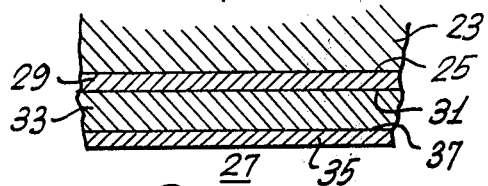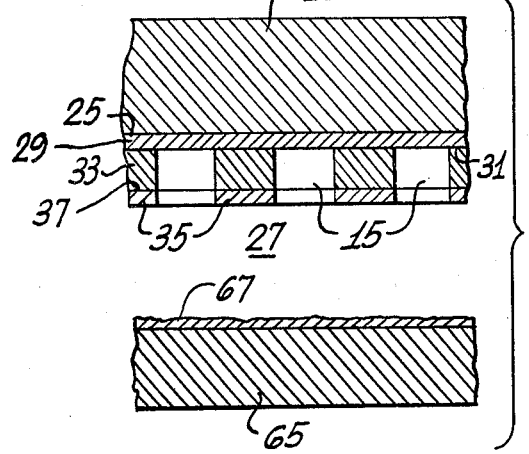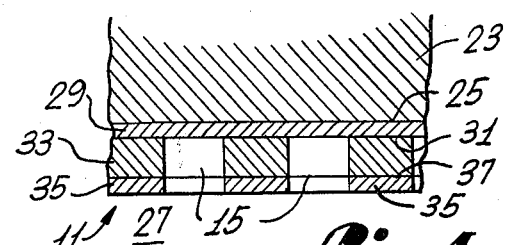

DIELECTRIC RECORDING MEDIUM

BACKGROUND OF THE INVENTION

This invention relates generally to information recording media and, more particularly, to recording media of the type in which information can be recorded and read by optical techniques.

Information recording media of this particular type are especially adapted for use as discs for storing frequency-modulated video signals and digital data. In the past, record discs of this type have typically comprised thin metallic films that are coated onto glass substrates using standard vacuum techniques. Information has typically been recorded in such a disc by a thermal process in which an intensity-modulated beam of radiation is focused onto the disc as the disc is rotated with respect to the beam, whereby a series of microscopic holes are melted in the metal film. A more detailed discussion of this technique for melting holes in a metallic recording medium is set forth in a co-pending and commonly assigned application for U.S. Pat. Ser. No. 890,407, filed in the name of John S. Winslow and entitled "Mastering Machine".

Metallic film recording media have not proven entirely satisfactory, however, because most of the energy in the beam of radiation is lost due to reflection off the outer surface of the film and transmission into the substrate, and because the metallic film ordinarily has a relatively high thermal conductivity and a relatively low melting temperature. This latter factor results in a conduction of the heat generated by the absorption of the beam of radiation radially outwardly from the point of impingement, which thus forms a hole in the film significantly larger than the cross-sectional size of the beam. This limits the density of information that can be stored on the recorded medium. Additionally, melting of the metal film usually results in a metallic residue being deposited around the periphery of each pit, thereby reducing the signal-to-noise ratio of the signal that can be reproduced from the medium.

An improved information recording medium is described in U.S. Pat. No. 4,097,895, issued in the name of F. W. Spong and entitled "Multilayer Optical Record". The record medium described therein includes a layer of highly light-absorptive organic dye material overlaying a substrate having an upper light-reflective surface. The thickness of the light-absorptive layer is selected to establish an anti-reflection condition for an intensity-modulated beam of light being directed at it, whereby the energy in the light beam is coupled into the material with a higher optical efficiency than was previously the case with metallic film recording media. A series of holes is thus evaporated in the dye material, with a minimum light beam intensity. Organic dye materials typically have a relatively low thermal conductivity, so the successive holes formed by the intensity-modulated light beam are relatively small, and a relatively high recording density can be achieved.

Although the aforementioned multilayer optical recording medium can be used advantageously in some situations, there is still a need for a recording medium wherein energy can be coupled from a beam of radiation to the medium with even greater optical efficiency, especially for light-absorptive materials having relatively low indices of absorption, and especially when the light-absorptive layer has sufficient thickness to permit use of the record medium as a master for use in replication. The present invention fulfills this need.

SUMMARY OF THE INVENTION

Basically, the present invention is embodied in an improved information recording medium for use with a recording apparatus of the type that directs onto the medium, as it is moved at a prescribed velocity, a write beam of radiation that is modulated in intensity by information to be recorded. This forms a sequence of information-bearing microscopic pits in a prescribed pattern in the medium. The recording medium includes a substrate having a highly light-reflective upper surface, with a layer of light-absorptive dielectric material overlaying the substrate. The thickness of the dielectric layer is selected to be approximately an odd multiple of one-fourth the wavelength of the write beam of radiation in the dielectric material, so that it constitutes an anti-reflective film for the write beam. In accordance with the invention, the recording medium further includes a very thin metallic layer overlaying the dielectric layer, with the lower surface of the metallic layer being highly light-reflective, thereby increasing the proportion of the write beam that is retained within the dielectric layer by multiple internal reflections and, accordingly, enhancing the optical efficiency of the record medium.

As a result, whenever the intensity of the write beam of radiation exceeds a predetermined threshold, the portion of the dielectric layer absorbing the beam is evaporated with a relatively high optical efficiency. Since the intensity of the write beam is alternately above and below this threshold, a succession of minute pits, indicative of the information being recorded, is formed in the dielectric layer and in the corresponding overlaying portions of the metallic layer. Also, since the dielectric material ordinarily has a relatively low thermal conductivity, each of the successive pits will be comparable in size to that of the spot formed by the write beam at its point of impingement on the medium. Thus, information can be recorded in the medium with a very high recording density. Further, since only a relatively small amount of metallic material is removed by the formation of each pit and since the dielectric material is evaporated rather than melted, there is very little material residue surrounding the pits and the information can be recovered at a relatively high signal-to-noise ratio.

More particularly, the recording medium of the present invention preferably is in the form of a record disc having a glass or plastic substrate, an overlay of a dielectric material, such as silicon monoxide, with a relatively low light-absorptive index, and an outer metallic layer having a thickness of less than about 50 A° and preferably formed of aluminum. The disc has particular utility in combination with a direct-read-after-write recording apparatus, which produces both a write beam of radiation and a read beam of radiation, which has a lower intensity than the write beam, and which is directed at the pits immediately after they are formed, to verify that the proper information has been recorded. The recording apparatus operates to rotate the disc at a prescribed angular velocity, while slowing moving the points of impingement of the write and read beams of radiation radially relative to the disc, whereby the information-bearing pits are formed in a plurality of substantially circular tracks arranged in either a spiral or concentric circle pattern on the disc.

The read beam of radiation has a substantially lower intensity than does the write beam, so that it cannot function to evaporate any portion of the recording medium. Additionally, the read beam preferably has a wavelength longer than that of the write beam, such that when it is directed at a portion of the information track on the record disc not occupied by a pit, the metallic and light-absorptive layers do not present an interference film and a substantial proportion of the read beam will be reflected therefrom. Conversely, when the read beam is directed at a pit that has been formed in the medium, it will be reflected by the exposed light-reflective surface of the substrate, but also, because of the small size of the pit relative to the wavelength of the read beam, it will be diffracted and scattered significantly when it exits the pit. Thus, as the read beam scans an information track, a reflected beam of radiation having an intensity that is modulated by the recorded information, will be produced.

When the recording medium of the present invention is utilized in combination with a direct-read-after-write recording apparatus, it preferably further includes a transparent plastic protective layer spaced a predetermined distance over the outer metallic layer. Both the write beam of radiation and the read beam of radiation are transmitted through this protective layer, without any substantial attenuation occurring.

The light-reflective surface of the substrate can more particularly comprise an inner layer of metallic material, which is highly reflective of both the write beam of radiation and the read beam of radiation. This inner metallic layer preferably is formed of aluminum and is approximately 600 A° thick.

In accordance with another aspect of the present invention, the information recording medium also has special utility as a master record medium for use in replication. When used for this purpose, it is preferable that the combined thickness of the dielectric layer and the metallic layer, in which the successive pits are formed, exceed approximately 1000 A°.

Other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 1 is a simplified block diagram of a direct-read-after-write recording apparatus for recording information on an information record disc, and for recovering the information therefrom to verify that it was properly recorded;

FIG. 2 is an enlarged plan view of a portion of the information record disc depicted in FIG. 1, showing the arrangement of information-bearing pits that form the plurality of parallel information tracks;

FIG. 3 is a sectional view (not to scale) of an information recording medium in accordance with the present invention, prior to the formation of information-bearing pits therein;

FIG. 4 is a sectional view of the recording medium of FIG. 3, after the information-bearing pits have been formed therein by the apparatus of FIG. 1; and FIG. 5 is a sectional view of another information recording medium in accordance with the present invention, this medium having a transparent protective layer, spaced from the information-bearing layers.

DESCRIPTION OF THE PREFERRED EMBODIMENTS

Referring now to the drawings, and particularly to FIG. 1, there is shown the optical portion of a direct-read-after-write recording apparatus for recording information on a rotatable information recording disc 11 and for then verifying that the correct information has been recorded. The apparatus operates by directing an intensity-modulated write beam of radiation 13 onto the disc, as the disc is rotated at a prescribed angular velocity, to form a succession of microscopic information-bearing pits 15 (FIG. 2), arranged in a plurality of substantially circular information tracks 17 in a spiral or concentric circle pattern on the disc. Further, the apparatus operates to verify that the information was properly recorded on the disc by directing a read beam of radiation 19, of substantially uniform intensity, onto the successive pits immediately after they are formed, whereby an intensity-modulated reflected beam 21 is produced, having a relatively low intensity when a pit is being scanned and a relatively high intensity when a region not occupied by a pit is being scanned.

FIG. 3 is a simplified cross-sectional view of the information recording disc 11 that is used with the recording apparatus of FIG. 1. The disc includes a poly methyl methacrylate substrate 23 having an upper planar surface 25, along with a plurality of special layers overlaying the planar surface. Although a particular orientation is specified for the disc in describing the relative positions of the various special layers, it will be appreciated that the invention is not limited to any one special orientation. The write beam of radiation 13 is transmitted through a medium of air 27 adjacent the disc and is focused to a diffraction-limited spot 28 on the outermost one of the special layers.

In accordance with the invention, the special layers of the disc 11 include an inner metallic layer 29 overlaying the planar surface 25 of the substrate 23 and having an upper light-reflective surface 31, a light-absorptive dielectric layer 33 overlaying the inner metallic layer and having a thickness approximately equal to an odd integral multiple of one-fourth the wavelength of the write beam of radiation 13 in the dielectric material, and an outer metallic layer 35 overlying the dielectric layer and having a lower light-reflective surface 37. These layers can be coated on the substrate 23 using conventional techniques, such as vacuum deposition or sputtering. The inner and outer metallic layers can be formed advantageously of aluminum and the dielectric layer of silicon monoxide.

The disc 11 is positioned such that the respective write and read beams of radiation 13 and 19 are focused onto the outer metallic layer 35. The outer metallic layer is sufficiently thin, preferably less than about 50 A°, that it is essentially semi-transparent and only a very small proportion of the write beam incident thereon is absorbed. The inner metallic layer 29 preferably has a thickness of about 600 A° and it reflects substantially all of the radiation incident on it. Additionally, since the dielectric layer 33 has a thickness approximately equal to an odd integral multiple of one-fourth the wavelength of the write beam in the dielectric material, the layer acts as an interference or anti-reflection film, thereby reducing substantially initial reflection of the write beam at the interface between the air 27 and the outer metallic layer 35 and reducing substantially transmission of the write beam into the inner metallic layer 29 and the substrate 23. As a consequence, only a very small proportion of the energy in the write beam is wasted, with the remainder being absorbed by the dielectric layer.

The dielectric layer 33 preferably comprises a material that undergoes sublimation rather than melting, such that the material evaporates to leave a relatively residue-free pit whenever the intensity of the write beam of radiation 13 exceeds a predetermined threshold. FIG. 4 depicts the recording medium of FIG. 3 after the evaporation of selected portions of the dielectric layer 33 has occurred. It will be noted that the evaporating material has carried with it the overlaying portions of the outer metallic layer 35, whereby the succession of information-bearing pits 15 have been formed.

It will be appreciated that the respective proportions of the write beam of radiation 13 that are reflected and transmitted at each of the boundaries between the respective layers vary as a function of the respective complex indices of refraction of the layers and, additionally, as a function of the respective thicknesses of the layers, such thickness affecting the phase shifts undergone by the write beam in each layer. By selecting the thickness of the dielectric layer 33 to be approximately an odd integral multiple of one-fourth the wavelength of the write beam in the dielectric material, interference principles result in only a very small proportion of the beam being lost to initial reflection off the outer metallic layer 35 or transmission into the inner metallic layer 29 and the substrate 23. Most of the write beam is then confined to the dielectric layer by being reflected repeatedly by the light-reflective surfaces 31 and 37 of the inner and outer metallic layers 29 and 35, respectively. Thus, the effective path length of the write beam in the dielectric material is increased and, despite its having a relatively low index of absorption, the material can be evaporated with a relatively low-intensity beam. It is important to note that the outer metallic layer functions to enhance the proportion of the write beam that is reflected repeatedly back into the dielectric layer, where it is eventually absorbed.

A more detailed discussion of the computations necessary to determine the precise proportions of the write beam that are transmitted or reflected at the boundaries between the various special layers is provided in an article written by A. E. Bell and F. W. Spong, entitled "Antireflection Structures for Optical Recording", appearing in *IEEE Journal of Quantum Electronics*, Vol. QE-14, No. 7, July 1978.

It will also be appreciated that when the intensity of the write beam 13 exceeds a predetermined level, there will be sufficient energy absorbed by the dielectric material to cause it to be evaporated. Also, since the intensity-modulated write beam has an intensity that is alternately greater than and less than that predetermined level, in accordance with the information to be recorded, a succession of pits 15, indicative of the information, will be formed. When sufficient energy is absorbed by the dielectric material to cauuse it to be evaporated, the evaporating material will carry with it the overlaying portion of the outer metallic layer 35. Thus, a pit is formed in both the dielectric layer 33 and the outer metallic layer.

Since the dielectric layer 33 has a relatively low thermal conductivity, as compared with that of metallic film recording media of the prior art, heat is not conducted radially outwardly to any significant degree from the point of impingement of the write beam 13 with the disc 11. Thus, each pit 15 formed in the disc has a size approximately equal to the size of the spot formed by the write beam. Additionally, since the preferred dielectric material undergoes sublimation, rather than melting, very little residue is deposited around the periphery of each pit. A consequence of this capability of forming relatively small and residue-free pits is that a relatively high information recording density can be achieved and the information can be recovered from the disc with a relatively high signal-to-noise ratio.

With reference again to FIG. 1, the direct-read-after-write recording apparatus for recording information on the disc 11 will now be described in greater detail. The write beam of radiation 13 is produced by a write laser 39, such as a helium cadmium laser, which produces a monochromatic beam having a wavelength of about 4420 A°. This constant-intensity beam is transmitted to an intensity modulator 41, which modulates the intensity of the beam in accordance with a digital data signal supplied over line 43 from a data subsystem (not shown). The intensity modulator 41 preferably comprises an acousto-optic modulator, but also can comprise a piezoelectric crystal, or Pockel's cell. Depending on the state of the digital data signal, the intensity of the modulated beam is alternately above and below the intensity threshold for evaporating the dielectric material, so a corresponding pattern of pits is formed in the disc.

The intensity-modulated write beam is transmitted from the modulator 41 through a first beam splitter 45, a diverging lens 47, and a quarter-wave plate 49, after which it is reflected by a tracking mirror 51 and focused to the spot 28 on the disc 11 by an objective lens 53. The disc is rotated at a prescribed angular velocity by a spindle motor 55, and the mirror and the objective lens are mounted on a carriage (not shown) that is movable radially relative to the disc, whereby the information can be recorded successively in the plurality of substantially circular information tracks 17 (FIG. 2).

The read beam of radiation 19, which is utilized in reading the information immediately after it has been recorded on the disc 11, is produced by a read laser 57 and has a constant intensity, substantially less than that of the write beam 13. The read laser can advantageously comprise a helium neon laser, which produces a beam of radiation having a wavelength of approximately 6328 A°. By then making the thickness of the dielectric layer 33 approximately equal to ¾ of the wavelength of the write beam 13 in the dielectric material, it will automatically be about ½ of the wavelength of the read beam in the material. Thus, destructive interference causes the medium to be substantially non-reflective of the write beam, while constructive interference causes the medium to be highly reflective of the read beam. If the dielectric layer is comprised of silicon monoxide, its thickness is then close to 2000 A°.

The read beam 19 is initially directed through a second beam splitter 59 to the first beam splitter 45, where it is reflected and combined with the write beam of radiation 13. Thereafter, it follows essentially the same path as the write beam until it is focused to a diffraction-limited spot 60 on the disc 11. The two beams are aligned such that their respective points of impingement 28 and 60 on the disc are approximately 25 microns apart, with the disc positioned such that they are on a common radius and rotating such that the write beam scans a given point on that radius immediately prior to the read beam.

Since the information recording disc 11 does not constitute an anti-reflective film for the read beam of radiation 19, which has a longer wavelength than the write beam 13, a substantial proportion of the read beam is reflected from the disc back to the objective lens 53 whenever the beam impinges on a portion of the disc not occupied by a pit 15. Also, although the light-reflective surface 31 of the inner metallic layer 29 is exposed to the air 27 through each pit 15 and the read beam is reflected thereby whenever it is focused on a pit, the small size of the pits, relative to the wavelength of the read beam, causes substantial diffraction or scattering of the reflected beam. Thus, only a small proportion of the read beam is reflected back to the objective lens whenever a pit is being scanned, especially when a lens with a relatively low numerical aperture is used.

The portion of the read beam 19 that is reflected from the disc 11 and collected by the objective lens 53 forms the reflected beam of radiation 21 that has an intensity that is modulated by the recorded information. This reflected beam is transmitted from the objective lens via the mirror 51, the quarter-wave plate 49, and the diverging lens 47 to the first beam splitter 45, where it is reflected and transmitted to the second beam splitter 59. The reflected read beam is then reflected by the second beam splitter to a photodetector 61, which demodulates the beam and produces a corresponding digital data signal. This signal is supplied over line 63 to appropriate circuitry (not shown) for verifying that the correct information was recorded on the disc 11.

FIG. 5 is a simplified cross-sectional view of an alternative form of a multi-layer record disc 11' constructed in accordance with the present invention. The disc is generally equivalent to that depicted in FIG. 3, except that it further includes a transparent protective layer 65 disposed in spaced relationship to the information-bearing layers of the disc. The protective layer is preferably spaced about 25 microns from outer metallic layer 35, and it functions primarily to protect the outer metallic layer and the dielectric layer 33 from abrasion after information has been recorded therein. Only negligible proportions of both the write beam of radiation 13 and the read beam of radiation 19 are absorbed by the protective layer.

It will be appreciated that after information has been recorded on the disc 11' of FIG. 5, the protective layer 65 may have a thin coating of material 67 deposited thereon because of the evaporation of the dielectric and outer metallic layers 33 and 35, respectively. This coating does not have any significant effect on the readability of the recorded disc, however, because it is so thin that most of the read beam of radiation 13 will be transmitted and because it is spaced sufficiently far from the focal plane of the objective lens 53 that any localized unevenness in the thickness of the coating will be averaged out.

In addition to use in direct-read-after-write apparatus of the type shown in FIG. 1, the information recording medium of FIG. 3 can also be used advantageously as a master recording disc for use in the replication of discs for playback use only. Suitable apparatus for producing such replication masters is described in the aforementioned application for U.S. Pat. Ser. No. 890,407. For this use, the combined thickness of the dielectric layer 33 and the outer metallic layer 35 is preferably between 1000 and 1300 A°, so that the pits will have sufficient depth to produce replicas that are readily readable by conventional playback apparatus. Use of the information recording disc of the present invention in such a mastering machine permits the use of a write beam of much lower intensity than was heretofore possible with recording media of the prior art. Additionally, substantially higher recording densities and signal-to-noise ratios for such replication masters are attainable when recording media in accordance with the present invention are utilized.

From the foregoing description, it should be apparent that the present invention provides an improved information recording medium for use in both direct-read-after-write and master recording apparatus, which enables the use of a lower-intensity write beam of radiation, while at the same time providing a relatively high information recording density and an improved signal-to-noise ratio.

Although the invention has been described in detail with reference to its presently preferred embodiments, it will be understood by one of ordinary skill in the art that various modifications can be made without departing from the spirit and scope of the invention. Accordingly, it is not intended that the invention be limited, except as by the appended claims.

I claim:

1. An information recording medium for use with a recording apparatus wherein a write beam of radiation having a prescribed wavelength and having an intensity modulated by information to be recorded is directed at the recording medium as the medium is moved with respect thereto, whereby a succession of pits representative of the information is formed in a prescribed pattern on the medium, said recording medium comprising:

a substrate having an upper light-reflective surface;

a layer of light-absorptive dielectric material overlaying the light-reflective surface of said substrate and having a prescribed thickness approximately equal to an odd integral multiple of one-fourth the wavelength of the write beam of radiation in the dielectric material; and a layer of metallic material overlaying the light-absorptive layer and having a lower light-reflective surface, said metallic layer being positioned to receive the intensity-modulated write beam of radiation and to transmit the beam to the dielectric layer, and being sufficiently thin to absorb only a small proportion of the radiation transmitted therethrough, wherein a substantial proportion of the intensity-modulated write beam of radiation is transmitted through said metallic layer into said dielectric layer where, due to repeated internal reflections at the respective boundaries between the dielectric layer and the substrate and between the dielectric layer and the metallic layer, it is confined until a sufficient proportion of the beam is absorbed to vaporize selected portions of the dielectric layer, the vaporized material carrying with it the corresponding portions of the overlaying metallic layer, whereby the succession of pits is formed in the dielectric and metallic layers of the medium.

2. An information recording medium as defined in claim 1, wherein the light-reflective surface of said substrate comprises a layer of metallic material.

3. An information recording medium as defined in claim 1, wherein said light-absorptive dielectric layer is comprised of silicon monoxide; and said metallic layer is comprised of aluminum.

4. An information recording medium as defined in claim 1, wherein:

the recording medium is used with recording apparatus of the type that further directs a read beam of radiation at the medium to verify that information has been properly recorded therein, said read beam having a wavelength different from that of the write beam of radiation;

the thickness of said dielectric layer is selected such that portions of the medium not occupied by a pit are relatively reflective of the read beam of radiation; and the sizes of the pits formed in the medium are sufficiently small that when a pit is being scanned by the read beam of radiation, the beam is scattered thereby, whereby a reflected beam of radiation is produced, having an intensity modulated the pattern of information-bearing pits.

5. An information recording medium as defined in claim 1, wherein the combined thickness of said dielectric layer and said metallic layer exceeds approximately 1000 A°, whereby the medium can be used as a replication master.

6. An information recording medium as defined in claim 1, further including a layer of transparent material disposed in spaced relationship to said metallic layer, said transparent layer protecting said metallic layer and said dielectric layer from damage due to abrasion after the information-bearing pits have been recorded therein.

7. An information recording medium for use with a playback apparatus having means for scanning the medium with a read beam of radiation having a prescribed wavelength, as the medium is moved with respect thereto, and means for detecting a reflected beam of radiation having an intensity modulated by the information stored on the medium, said record medium comprising:

a substrate having an upper light-reflective surface;

a layer of dielectric material overlaying the light reflective surface of said substrate;

a semi-transparent layer of metallic material overlaying the dielectric layer and having a lower light-reflective surface;

wherein an information track in the form of a succession of spaced information-bearing pits is formed in said dielectric layer and said metallic layer;

wherein the thickness of said dielectric layer is selected to be approximately an integral multiple of one-half the wavelength of the read beam of radiation in the dielectric material, whereby when portions of the medium not occupied by an information-bearing pit are being scanned by the read beam, a reflected beam of radiation having a relatively high intensity is produced; and wherein the sizes of the successive information-bearing pits are sufficiently small that when an information-bearing pit is scanned by the read beam, the beam is scattered significantly thereby and a reflected beam of radiation having a relatively low intensity is produced, whereby the reflected beam of radiation produced by scanning the information track has an intensity modulated by the pattern of information-bearing pits.

8. An information recording medium as defined in claim 7, wherein the light-reflective surface of said substrate comprises a layer of metallic material.

9. An information recording medium as defined in claim 7, wherein:

said dielectric layer is comprised of silicon monoxide; and said metallic layer is comprised of aluminum.

10. An information recording medium as defined in claim 7, further including a layer of transparent material disposed in spaced relationship to said metallic layer, said transparent layer protecting said metallic layer and said dielectric layer from damage due to abrasion after the information-bearing pits have been recorded therein.

11. An information recording medium as defined in claim 7, wherein the semi-transparent metallic layer has a thickness of less than about 50 A°.

12. In an information recording medium for use with a recording apparatus that directs onto the medium, as the medium is moved with respect thereto, a write beam of radiation, having a prescribed wavelength and an intensity modulated by information to be recorded, thereby forming a succession of pits in a prescribed pattern in the medium, said medium including a substrate having an upper light-reflective surface and a layer of light-absorptive dielectric material, which overlays the light-reflective surface of said substrate and has a prescribed thickness approximately equal to an odd integral multiple of one-fourth the wavelength of the write beam of radiation in the dielectric material, the improvement comprising:

a layer of metallic material overlaying the light-absorptive layer and having a lower light-reflective surface, said metallic layer being positioned to receive the intensity-modulated write beam of radiation and to transmit the beam to the dielectric layer, and said metallic layer being sufficiently thin to absorb only a small proportion of the radiation transmitted therethrough, wherein a substantial proportion of the intensity-modulated write beam of radiation is transmitted through said metallic layer into said dielectric layer where, due to repeated internal reflections at the respective boundaries between the dielectric layer and the substrate and between the dielectric layer and the metallic layer, it is confined until a sufficient proportion of the beam is absorbed to vaporize selected portions of the dielectric layer, the vaporized material carrying with it the corresponding portions of the overlaying metallic layer, whereby the succession of pits is formed in the dielectric and metallic layers of the medium.

13. An improvement as defined in claim 12, wherein the light-reflective surface of said substrate comprises a layer of metallic material.

14. An improvement as defined in claim 12, wherein:

said light-absorptive dielectric layer is comprised of silicon monoxide; and said metallic layer is comprised of aluminum.

15. An improvement as defined in claim 14, wherein said metallic layer has a thickness of about 100 A°.

16. An improvement as defined in claim 12, wherein:

the recording medium is used with recording apparatus of the type that further directs a read beam of radiation at the medium to verify that information has been properly recorded therein, said read beam having a wavelength different from that of the write beam of radiation;

the thickness of said dielectric layer is selected such that portions of the medium not occupied by a pit are relatively reflective of the read beam of radiation; and the sizes of the pits formed in the medium are sufficiently small that when a pit is being scanned by the read beam of radiation, the beam is scattered thereby, whereby a reflected beam of radiation is produced, having an intensity modulated by the pattern of information-bearing pits.

17. An information recording medium for use with a direct-read-after-write recording apparatus that includes means for moving the medium at a prescribed velocity, means for focusing onto the moving medium a write beam of radiation having a prescribed wavelength and having an intensity modulated by information to be recorded, thereby forming a succession of pits in a prescribed pattern in the medium, and means for focusing onto the moving medium a read beam of radiation to verify that the information has been correctly recorded therein, said read beam of radiation having a prescribed wavelength different from that of said write beam of radiation, said recording medium comprising:

a substrate having a generally planar upper surface;

an inner layer of metallic material overlaying the substrate and having a light-reflective surface on its upper side;

a layer of light-absorptive dielectric material overlaying said inner metallic layer and having a prescribed thickness approximately equal to an odd integral multiple of one-fourth the wavelength of the write beam of radiation in the dielectric material; and an outer layer of metallic material overlaying said dielectric layer and having a lower light-reflective surface, said outer metallic layer being positioned to receive the intensity-modulated write beam of radiation and to transmit the beam to the dielectric layer, and being sufficiently thin to absorb only a small proportion of the radiation transmitted therethrough, wherein a substantial proportion of the intensity-modulated write beam of radiation is transmitted through said outer metallic layer into said dielectric layer where, due to repeated internal reflections at the boundaries between the dielectric layer and the light-reflective surfaces of the respective inner and outer metallic layers, it is confined until a sufficient proportion of the beam is absorbed to vaporize selected portions of the dielectric layer, the vaporized material carrying with it the corresponding portions of the overlaying outer metallic layer, whereby the succession of pits is formed in the dielectric and outer metallic layers of the medium, and wherein the wavelength of the read beam of radiation is selected such that when portions of the medium not occupied by an information-bearing pit are being scanned by the read beam, a reflected beam of radiation having a relatively high intensity is produced, and the sizes of the successive pits are sufficiently small that when a pit is being scanned by the read beam, the beam is scattered significantly thereby and a reflected beam of radiation having a relatively low intensity is produced, whereby the intensity of the reflected beam of radiation is modulated by the pattern of information-bearing pits.

18. An information recording medium as defined in claim 17, wherein the combined thickness of said dielectric layer and said outer metallic layer exceeds approximately 1000 A°, whereby the medium can be used as a replication master.

19. An information recording medium as defined in claim 17, further including a layer of transparent material disposed in spaced relationship to said outer metallic layer, said transparent layer protecting said outer metallic layer and said dielectric layer from damage due to abrasion after the information-bearing pits have been recorded therein.

20. An information recording medium as defined in claim 17, wherein the thickness of said dielectric layer is further selected to be approximately equal to an integral multiple of one-half the wavelength of the read beam of radiation in the dielectric material, whereby constructive interference makes the medium highly reflective of the read beam, while destructive interference makes the medium highly non-reflective of the write beam.

21. A recording system comprising:

an optical recording medium including
a substrate having an upper light-reflective surface,
a layer of light-absorptive dielectric material overlaying the light-reflective surface of the substrate and having a prescribed, uniform thickness, and
a layer of metallic material overlaying the light-absorptive layer and having a lower light-reflective surface;

means for producing a write beam of radiation having a prescribed wavelength and having an intensity modulated by information to be recorded in the recording medium;

means for producing a read beam of radiation having a prescribed wavelength and intensity; and means for directing the write beam and read beam at the metallic layer of the recording medium as the medium is moved with respect thereto, wherein the metallic layer transmits a substantial proportion of the write beam to the light-absorptive layer;

wherein the prescribed thickness of the light-absorptive layer is approximately equal to an odd integral multiple of one-fourth the wavelength of the write beam in the light-absorptive dielectric material, such that the beam is repeatedly internally reflected at the respective boundaries of the light-absorptive layer until a sufficient proportion is absorbed to vaporize selected portions of the light-absorptive layer, the vaporized material carrying with it the adjacent portions of the overlaying metallic layer, whereby a succession of pits, representative of the information being recorded, is formed in the light-absorptive and metallic layers of the recording medium;

and wherein the prescribed thickness of the light-absorptive layer is approximately equal to an integral multiple of one-half the wavelength of the read beam in the light-absorptive dielectric material, such that the beam is highly reflected when it impinges on a portion of the recording medium not occupied by a pit, but is highly scattered when it impinges on a pit, to produce a reflected beam having an intensity modulated by the recorded information.

22. An optical recording system as defined in claim 21, wherein the substrate of the recording medium includes a lower layer of metallic material, the upper light-reflective surface of the substrate being defined by the lower metallic layer.

23. An optical recording system as defined in claim 21, wherein:
   the light-absorptive dielectric layer is comprised of silicon monoxide; and
   the metallic layer is comprised of aluminum.

24. An optical recording system as defined in claim 21, wherein the combined thickness of the light-absorptive dielectric layer and the metallic layer exceeds approximately 1000 A°, whereby the recording medium us suitable for use as a replication master.

25. An optical recording system as defined in claim 21, wherein the recording medium further includes a layer of transparent material disposed in spaced relationship with the metallic layer, the transparent layer protecting the metallic layer and light-absorptive dielectric layer from damage due to abrasion.

26. An information playback system comprising:
   an optical recording medium including
      a substrate having an upper light-reflective surface,
      a layer of dielectric material overlaying the light reflective surface of said substrate, and
      a semi-transparent layer of metallic material overlaying the dielectric layer,
      wherein an information track in the form of a succession of spaced information-bearing pits is formed in the dielectric layer and the metallic layer;
   means for producing a read beam of radiation having a prescribed wavelength and intensity; and
   means for directing the read beam at the recording medium as the medium is moved with respect thereto, such that the beam scans the information track in a prescribed fashion;
   wherein the thickness of the dielectric layer is selected to be approximately an integral multiple of one-half the wavelength of the read beam in the dielectric material, whereby when portions of the medium not occupied by an information-bearing pit are scanned by the read beam, a reflected beam of radiation having a relatively high intensity is produced;
   and wherein the sizes of the successive information-bearing pits are sufficiently small that when a pit is scanned by the read beam, the beam is scattered significantly thereby and a reflected beam of radiation having a relatively low intensity is produced, whereby the reflected beam of radiation produced by scanning the information track is modulated in intensity by the pattern of information-bearing pits.

27. An information playback system as defined in claim 26, wherein the substrate of the recording medium includes a lower layer of metallic material, the upper light-reflective surface of the substrate being defined by the lower metallic layer.

28. An information playback system as defined in claim 26, wherein:
   the dielectric layer is comprised of silicon monoxide; and
   the metallic layer is comprised of aluminum.

29. An information playback system as defined in claim 26, wherein the recording medium further includes a layer of transparent material disposed in spaced relationship to the metallic layer, the transparent layer protecting the metallic layer and the dielectric layer from damage due to abrasion.

* * * * *